March 22, 1932.                H. BEISSER                 1,850,311
                              KEY MACHINE
                     Filed Feb. 24, 1930      3 Sheets-Sheet 1
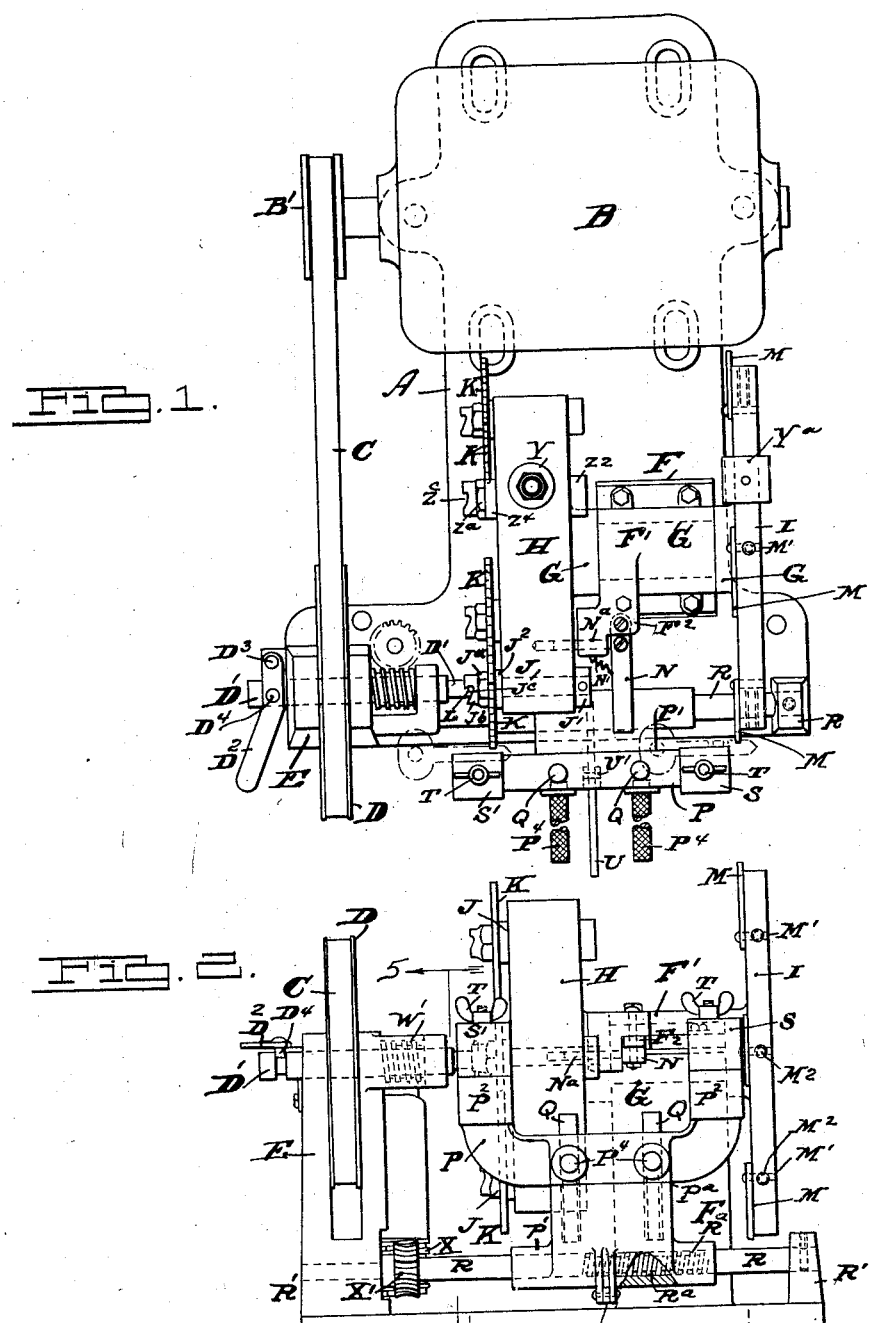
INVENTOR
Harry Beisser
BY
S. E. Thomas
ATTORNEY March 22, 1932.  H. BEISSER  1,850,311
KEY MACHINE
Filed Feb. 24, 1930   3 Sheets-Sheet 2
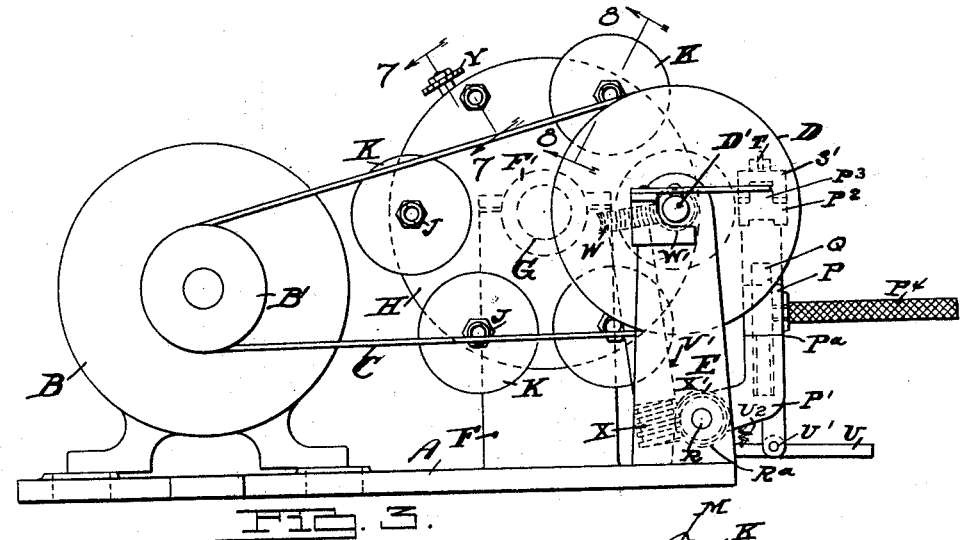
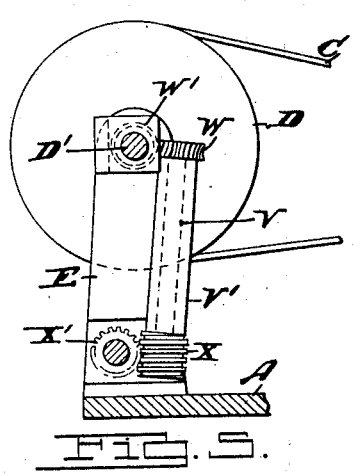
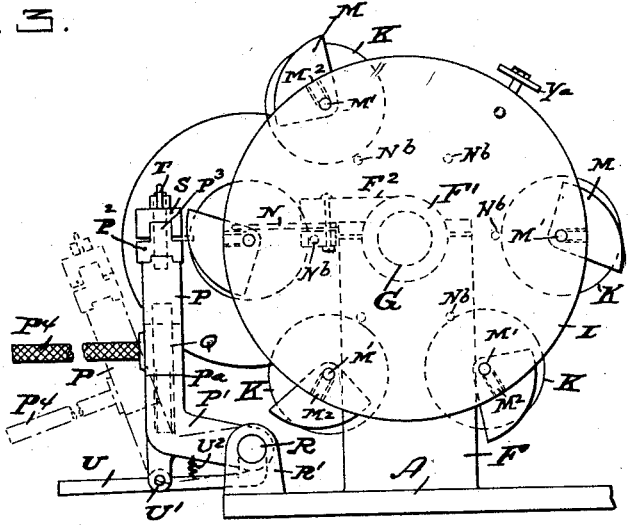
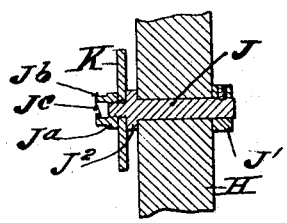
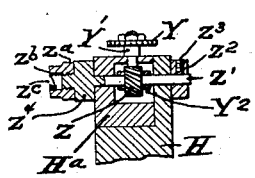
Harry Beisser
INVENTOR
BY S. E. Thomas
ATTORNEY

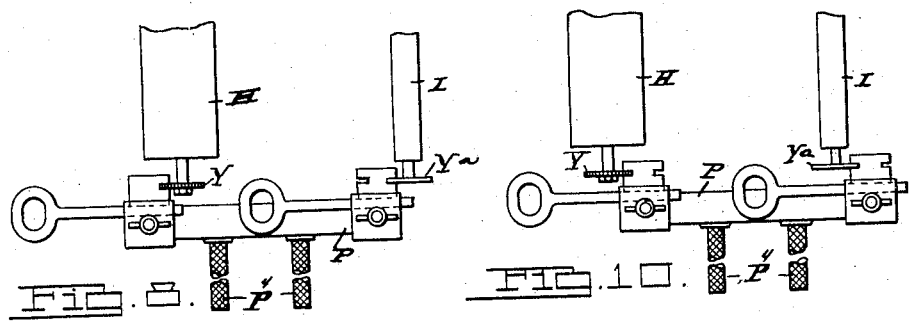
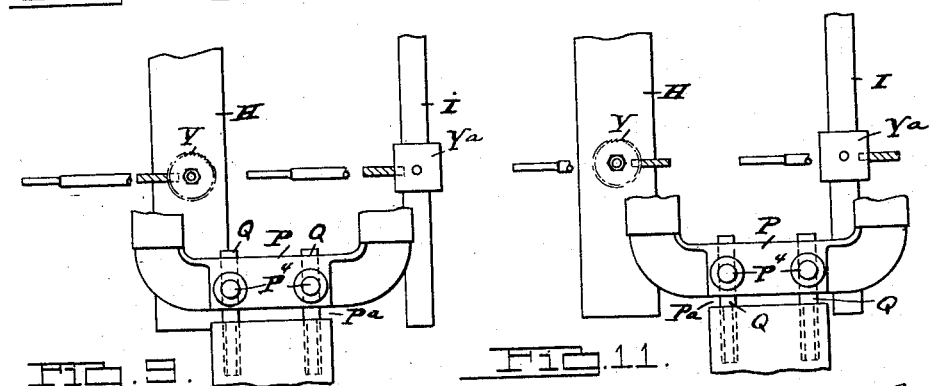
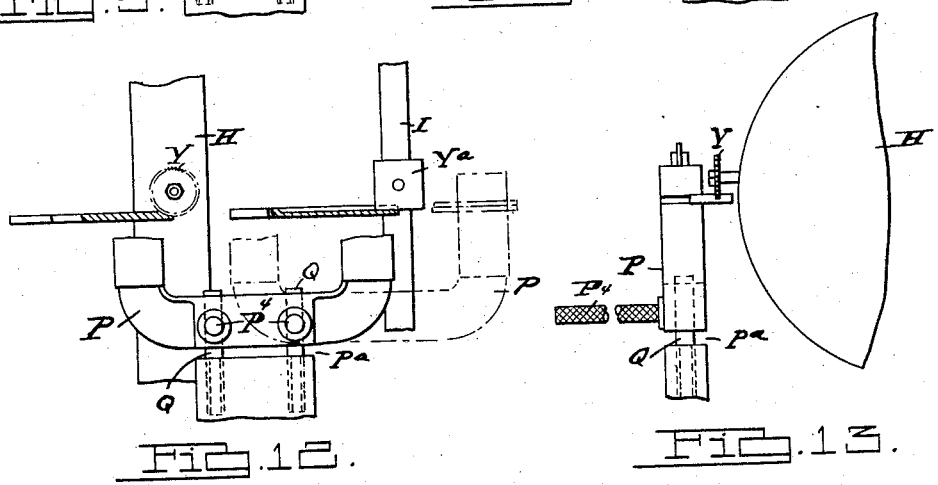
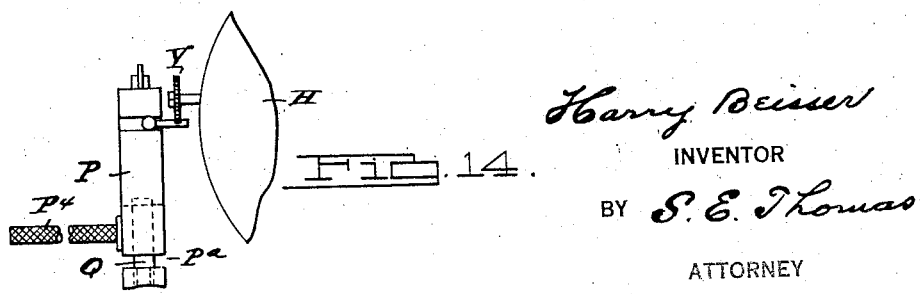

Patented Mar. 22, 1932

1,850,311

UNITED STATES PATENT OFFICE

HARRY BEISSER, OF DETROIT, MICHIGAN

KEY MACHINE

Application filed February 24, 1930. Serial No. 430,925.

My invention relates to a machine for cutting or duplicating keys shown in the accompanying drawings and more particularly described in the following specification and claims.

The object of this invention is to provide a key machine in which one of a plurality of guides is adapted to enter the grooves of a master key of different types while a coordinating cutter is engaged in cutting corresponding grooves in a key blank of similar type;—the guides and cutters being respectively supported upon a pair of turret-heads spaced apart by a sleeve integral therewith and rotatable in a journal carried by a supporting column rising from the base plate. The guides and corresponding cutters are radially aligned upon the respective turret-heads and are free to turn with the sleeve in the bearing,—when released,—that the guides and cutters may be shifted into position to act in conjunction with a master key, and corresponding key blank for cutting similar keys. The master keys and key blanks are held by gripping jaws carried by a longitudinally movable yoke, mounted upon a shaft parallel with the sleeve, including its integral turret-heads, and their respective guides and cutters,—whereby a suitable cutter and guide carried by the turret-heads may be brought into proper relation with the master key and key blank for duplication of the master key. The yoke-supporting member is adapted for either mechanical or manual adjustment upon its shaft, so that the guides may be directed either manually or automatically into the grooves of the master key while cutting corresponding grooves in the adjacent key blank—thereby duplicating the master key.

It will now be noted that one of the primary features of this invention consists in providing a machine wherein the different cutters and guides required in the duplication of keys of different types are respectively assembled upon a pair of turret-heads, spaced from each other by a sleeve integral with the heads and rotatable in a suitable journal bearing whereby the guide and corresponding cutter may be simultaneously brought into action to duplicate keys of different types without the necessity of removing detachable and previously mounted cutters and guides from the machine. In this machine there is no necessity to look for the required cutter and guide in a tool rack or upon the key bench, when preparing to duplicate keys of any type, thereby eliminating the loss of time that such effort entails.

By manually rotating the sleeve, the required cutter and respective guide for various flat, cylinder, or bit keys in general use are quickly and accurately brought into registration with a pair of clamping members designed to support a master key and corresponding key blank of the type to be duplicated.

Another feature of this invention is the means provided for locking the sleeve carrying the turret-heads, with the proper cutters and guides in fixed alignment with the clamping members supporting the master key and key blank, also the means employed for coupling the shaft of the cutter with a driving shaft actuated by an electric motor mounted upon the bed plate of the machine.

Another feature of the invention consists in providing means for automatically shifting the yoke—which may also be manually operated—carrying the clamping devices for supporting the master key and key blank in relation to the guide and the cutter,—whereby the grooves in the key are automatically duplicated.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a plan view of the machine driven by a motor mounted upon the bed plate of the machine.

Figure 2 is a front elevation of the same.

Figure 3 is a side elevation of the machine and motor.

Figure 4 is an elevation of the machine taken from the side opposite that shown in Figure 3.

Figure 5 is a vertical sectional elevation of a detail of the driving connection, taken on or about line 5—5 of Figure 2.

Figure 6 is a detail, sectional view through one of the cutters.

Figure 7 is a cross-sectional view through a ward cutter, taken on or about line 7—7 of Figure 3.

Figure 8 is a fragmentary detail showing clamping jaws supporting a master bit key and a corresponding key blank,—also the guide member entering the ward cut in the master key and the cutter forming the ward in the bit of the key blank.

Figure 9 is a fragmentary elevation with parts broken away and in section of the parts shown in Figure 8.

Figure 10 is a detail, similar to that indicated in Figure 8, showing the cutter and guide effecting a like operation upon the opposite side of the key bit.

Figure 11 is a fragmentary elevation of the detail shown in Figure 10, of a like character to that shown in Figure 9.

Figure 12 is a fragmentary elevation of the cutter and guide shown in the preceding views acting upon a flat key and key blank.

Figure 13 is a fragmentary elevation at right angles to the preceding view showing the cutter forming a longitudinal groove in a flat key.

Figure 14 is a fragmentary elevation showing the cutter forming the upper ward groove across the face of a bit key.

Referring now to the letters of reference placed upon the drawings:

A denotes the base plate of the machine adapted to be secured to a counter or other suitable support.

B indicates an electric motor, $B^1$ a pulley mounted on the motor shaft connected by a belt C with a pulley D mounted on a shaft $D^1$ journaled in bearings supported by a divided post E, extending upwardly from the base plate.

F denotes a column rising from the base plate for supporting a bearing $F^1$, in which is journaled a sleeve G carrying integral turret-heads H and I at each end of the sleeve. The turret-head H on its outer face is provided with a plurality of clamping members J, which are adapted to support a plurality of rotary cutters K of varying form, whereby grooves of different size and shape may be cut in a key blank.

The clamping devices for supporting the cutters consist of a short shaft J extending transversely through the turret-head with a nut $J^1$ pinned to the shaft overlapping the turret-head on one side and a flange $J^2$ overlapping the other side of the head and an adjustable nut $J^a$ having a projecting sleeve $J^b$ formed with a notch $J^c$, see Figures 1 and 6, to receive a driving pin L projecting from the shaft $D^1$ actuated by the pulley D.

The turret-head I integral with the sleeve G is provided with a plurality of segmental guides M, eccentrically mounted on stub shafts $M^1$ extending transversely through the turret-head. $M^2$ are set screws entering tapped radial holes in the turret-head and bearing on the stub shafts to secure the guides against displacement.

$F^2$ is a bracket arm integral with the bearing $F^1$ to which is pivoted a rocking arm N. $N^a$ is a lock pin pivoted to the arm N adapted to enter a plurality of holes $N^b$, bored in the inner face of the turret-head H to lock the sleeve G and turret-heads H and I, against accidental rotation. $N^1$ is a spring engaging the swinging arm N and the bracket $G^1$ for maintaining the pin $N^a$ in locked relation until manually released.

P is a swinging yoke divided at $P^a$ that it may be vertically adjusted upon a pair of pins Q rising from the bell-crank and $P^1$ of the yoke, sleeved upon the threaded portion $R^a$ of a shaft R, journaled in suitable bearings $R^1$, $R^1$ at each side of the machine. $P^2$, $P^2$ are stationary clamping jaws integral with the forked arms of the yoke, respectively provided with an upstanding tongue $P^3$ which the inverted U-shaped adjustable jaws S, $S^1$ are adapted to straddle.

T is an adjustable wing bolt extending downwardly through a bore in each of the adjustable jaws into the fixed jaws $P^2$ by the adjustment of which a master key is gripped by the clamping jaw S and a corresponding key blank is gripped by the adjustable jaw $S^1$.

$P^4$, $P^4$ are handles screwed into the yoke for raising and lowering the latter, which are also adapted to engage the pins Q, whereby the yoke may be held in its adjusted position.

U denotes a tilting arm, pivoted at $U^1$ to a bracket projecting downwardly from the yoke fixture $P^1$, and at one end is directed upwardly with a threaded portion not shown) adapted to engage the like threaded portion $R^a$ on the shaft R. $U^2$ denotes a spring engaging at one end the tilting arm, and at the other end the yoke fixture $P^1$, to maintain the threaded end portion of the tilting arm in mesh with the threaded portion of the shaft R, whereby upon rotating the shaft R, the clamping jaws carried by the forked arms of the yoke fixture will traverse the shaft R, carrying the master key and corresponding key blank in operative relation to the cutter and corresponding guide until manually released by tilting the arm U.

To provide for a driving connection between the shaft R and the driving shaft D, an inclined shaft V, sleeved in a bearing $V^1$ is fitted at its upper end with a worm-gear W, in mesh with a corresponding gear $W^1$ on the shaft $D^1$, and at the lower end of the shaft V is a worm gear X, in mesh with a worm gear $X^1$ mounted on the shaft R.

Means for cutting a ward groove in the face of a bit key, or a longitudinal groove in the face of a flat key, is provided by a cutter Y—see Figure 7—mounted on a shaft $Y^1$ extending outwardly from the periphery of the turret-head H. $Y^2$ is a worm gear on the shaft $Y^1$ in mesh with a like gear Z mounted upon a shaft $Z^1$ extending transversely through the wall of the turret-head and the fitting $H^a$, chambered to receive the gears $Y^2$ and Z. One end of the shaft $Z^1$ is fitted with a nut $Z^2$ overlapping the turret wall with a set screw $Z^3$ to secure the nut in position. The other end of the shaft $Z^1$ is provided with an enlarged head $Z^4$ overlapping the fitting $H^a$ and a screw nut $Z^a$ having a projecting annular collar $Z^b$, provided with an inclined slot $Z^c$ to receive the driving pin L of the drive shaft $D^1$,—see Figure 1.

Having indicated the several parts by reference letters, the construction and operation of the machine will be readily understood.

Let it be assumed that a flat key is to be duplicated,—to perform this operation, the master key is first secured between the adjustable jaw S and the fixed jaw $P^2$, with the notched portion of the key turned toward the turret carrying the guides.

A key blank of a type similar to the master key is then inserted between the adjacent adjustable jaw $S^1$ and the fixed jaw $P^2$, of the swinging slidable yoke P—see Figure 1 of the drawings. The arm N is then rocked to release the pin $N^a$, from engagement with the cutter carrying turret-head H, which being integral with the sleeve G, and the latter with the turret-head I, is then manually rotated in the bearing $F^1$, to bring the proper guide and cutter respectively into guiding relation with the master key, and simultaneously into cutting relation with the corresponding key blank, whereupon the turret-heads H and I are again locked against rotation by the pin $N^a$ entering a hole $N^b$ adjacent the cutter;—a locking hole $N^b$ being located adjacent each cutter in the turret-head H to secure the turret-heads against rotation. Before starting the machine, the shaft of the required cutter is locked in axial alignment with the driving shaft $D^1$ by the driving pin L, which projects from each side of the driving shaft into inclined notches $J^c$, formed in the projecting sleeve of the nut $J^a$ screwed upon the end of the shaft J of the clamping device for holding the cutter. The motor is then started by operating a suitable switch—not shown—the yoke carrying the master key and key blank being initially in the position shown in dotted lines in Figure 4. The operator then grasps the handles $P^4$, $P^4$, turning the handles slightly to release them from gripping engagement with the pins Q, Q,—the yoke with its clamping members gripping the master key and key blank is then rocked upon the shaft R toward the guide and cutting tool carried by the turret-heads H and I.

Upon the guide M entering the groove of the master key, the cutter K starts cutting a corresponding groove in the key blank,—the operator raising and lowering that portion of the yoke member carrying the master key and key blank upon the pins Q, Q by means of the handles $P^4$, $P^4$, in front of the cutter until a notch of the proper depth is cut, regulated by the guides M contacting with the body of the master key at the bottom of the corresponding notch therein.

To adjust the segmental eccentric guides M, to the depth of the grooves in the master key, the set screws $M^2$ are released sufficiently to permit the guides to rock into contact with the wall of the key at the bottom of the groove,—the set screw $M^2$ is then adjusted to secure the guide against release.

To shift the shaft $D^1$ longitudinally that the pin L may enter the notches $J^c$ of the sleeve nuts $J^b$, secured to the drive shafts of the several cutters,—or to release the shaft therefrom as may be required,—the operator rocks the swinging latch bar $D^2$ pivoted at $D^3$ to a bracket secured to the post E, that the pin $D^4$ projecting from the latch bar into a peripheral groove in the shaft $D^1$ may move the shaft longitudinally—see Figures 1 and 2—into or out of driving connection with the sleeve nuts of the cutters.

To cut side ward grooves, an upper transverse ward groove, or the "bittings" cut at the end of a bit-key, a master bit-key and a bit-key blank are secured between the clamping jaws carried by the yoke P, divided that it may be adjusted vertically in relation to the cutters and guides as required.

In the detail views, Figures 8–14, are shown the several operations of cutting grooves on each side of the key-bit and transversely across its face, as well as longitudinally upon a flat key. To cut the so called "bitting" grooves at the end of a key-bit, the master key and key blank are first secured by the clamping jaws in proper relation to the cutters and guides to effect the desired cuts in the bit of the key blank, obtained in like manner as has been previously described.

When cutting transverse or ward grooves across a bit-key or other like sustained cutting operation, the upturned helical end—not shown—of the tilting shaft is caused to engage the helical portion of the shaft D, whereupon the tilting yoke carrying the clamping jaws supporting the key blank and master key is automatically shifted into cooperating relation with the cutter Y and guide Y<sup>a</sup> carried by the rotatable turret-heads to cut a duplicate of the master key,—the yoke being released from driving connection with the shaft D on manually raising the tilting arm U upon the completion of the cutting operation.

It will be understood that upon the operator grasping the handles P<sup>4</sup>, P<sup>4</sup> to raise the clamping members holding the master key and key blank, the guide Y<sup>a</sup> will enter the groove in the master key and that the cutter Y will cut a groove in the key blank corresponding in depth to the groove in the master key, as determined by the guide member upon entering the groove.

Having thus described my invention, what I claim is:

1. In a machine of the character described, the combination of a supporting frame; a manually rotatable unitary element including a pair of turret-heads spaced apart in fixed relation to each other; a plurality of cutting tools mounted in spaced relation on one of said turret-heads contiguous to its perimeter; a plurality of co-ordinating guide members mounted on the other turret-head contiguous to its perimeter and in longitudinal alignment with the respective cutting tools of the adjacent turret head; a slidable rocking member adapted to support a master key and also a key blank and to be longitudinally actuated either manually or mechanically in relation to the tools and guides carried by said turret-heads; manually operated means for locking and releasing said turret-heads when rotated to bring the tools and guides of said turret-heads into cooperative relation with the master key and key blank, a driving shaft, means for actuating the driving shaft; and means whereby the cutting tools of the turret-head may be coupled with the driving shaft to actuate the respective cutting tools.

2. In a machine of the character described the combination of a supporting frame, a manually rotatable unit comprising a pair of turret-heads journaled in the frame, a plurality of cutting tools mounted on shafts carried by one of said turret-heads, a plurality of segmental guide members carried by the other turret-head in longitudinal alignment with the cutting tools of the first named turret-head, a prime mover, a driving shaft actuated by the prime mover, coordinating coupling elements respectively carried by the drive shaft and the shafts of the respective cutting tools, whereby the latter may be actuated by the drive shaft; manually operated means for longitudinally shifting the drive shaft into or out of coupling relation with the coupling means of the respective cutters; and means for supporting a master key and a key blank, whereby they may be respectively brought into co-operative relation with a suitable cutter and guide that the master key may be duplicated in the key blank.

3. In a machine of the character described, the combination of a supporting frame; a manually rotatable unit comprising a pair of turret-heads journaled in the frame; a plurality of cutting tools mounted on shafts carried by one of said turret-heads; a plurality of adjustable segmental guide members, carried by the other turret-head in longitudinal alignment with the respective cutting tools of the first named turret-head, designed to enter the grooves of a master key; a prime mover; a driving shaft actuated by the prime mover; coupling means at one end of the driving shaft and also on the shafts of the cutting tools adapted upon longitudinally shifting the driving shaft, to couple the driving shaft with the cooperating coupling means carried by the shafts of the respective cutting tools, whereby the latter may be actuated; manually operated means for longitudinally shifting the drive shaft into or out of coupling relation with the cutters; and means for supporting a master key and a key blank, adapted to be shifted into the path of a suitable cutter and corresponding guide member carried by the turret-heads, whereby the master key may be duplicated in the key blank.

4. In a machine of the character described, the combination of a supporting frame; a prime mover; a driving shaft actuated by the prime mover; a manually rotatable unit journaled in the frame; a plurality of cutting tools and a plurality of longitudinally aligned adjustable guide members mounted in spaced relation in said rotatable unit; means for interchangeably coupling the respective cutting tools with the driving shaft; a longitudinally extending threaded shaft journaled in the frame parallel with and actuated by the driving shaft; a manually slidable rocking member mounted upon the threaded shaft having a divided upper portion slidable upon posts carried by the lower portion, a pair of clamping members carried by said upper portion respectively adapted to grip a master key and a key blank; manually operated means for coupling and uncoupling the slidable rocking member with the helical portion of the shaft, whereby said rocking member may be either mechanically or manually shifted longitudinally upon said helical shaft; and means for raising and lowering the upper portion of said rocking member including the clamping members and master key and key blank in relation to the cutters and guides, whereby either upper or side wards may be cut in the key blank as required.

5. In a machine of the character described, in combination with a supporting frame; a driving shaft; a manually rotatable unit journaled in the frame, a plurality of cutting tools and a plurality of longitudinally aligned adjustable guide members mounted in spaced relation to each other in said rotatable unit; means for interchangeably coupling the respective cutting tools with the driving shaft; a longitudinally extending threaded shaft journaled in the frame parallel with and actuated by the driving shaft; a manually slidable rocking member mounted upon the threaded shaft having a divided upper portion movable vertically upon posts carried by the lower portion; a pair of clamping members carried by said upper portion respectively adapted to grip a master key and a key blank; manually operated means for raising, lowering and gripping the upper portion of the rocking-member upon and to the posts when adjusted, a manually operable tilting arm carried by and pivoted to said rocking member, adapted for cooperative engagement with the helical portion of the shaft on which the rocking member is slidably mounted, whereby said rocking member may be driven longitudinally along the shaft, or released for manual adjustment upon the shaft as required.

6. A machine of the character described, in combination with a supporting frame; a vertically disposed rotatable turret head journaled in the frame; a rotatable cutting tool mounted upon a short radial shaft extending through the rim of the vertically disposed rotatable turret head from a chamber therein; a worm gear mounted on said shaft within the chamber; a transverse shaft journaled in the walls of the vertically rotatable turret head fitted with a worm gear in mesh with the worm gear on the radial shaft of the cutting tool; a driving shaft; means for coupling the driving shaft with the transverse shaft; and manually operated means for shifting the driving shaft into coupling relation with said transverse shaft, to drive the cutting tool.

7. In combination with a machine of the character defined in claim 6, a rectangular shaped guide member, spaced in longitudinal alignment from the rotatable cutting tool, adapted to enter the ward groove in a master key, whereby a ward groove may be cut by said cutting tool in a key blank, to correspond in depth to the groove in the master key as determined by the rectangular guide member upon entering said groove in the master key.

In testimony whereof, I sign this specification.

HARRY BEISSER.